(12) United States Patent
Amin et al.

(10) Patent No.: US 9,888,016 B1
(45) Date of Patent: Feb. 6, 2018

(54) SYSTEM AND METHOD FOR DETECTING PHISHING USING PASSWORD PREDICTION

(71) Applicant: FireEye, Inc., Milpitas, CA (US)

(72) Inventors: Muhammad Amin, Fremont, CA (US); Mohan Samuelraj, Fremont, CA (US); Henry Uyeno, Sunnyvale, CA (US)

(73) Assignee: FireEye, Inc., Milpitas, CA (US)

( * ) Notice: Subject to any disclaimer, the term of this patent is extended or adjusted under 35 U.S.C. 154(b) by 79 days.

(21) Appl. No.: 13/931,664

(22) Filed: Jun. 28, 2013

(51) Int. Cl.
*H04L 29/06* (2006.01)

(52) U.S. Cl.
CPC .................. *H04L 63/1408* (2013.01)

(58) Field of Classification Search
CPC .................. H04L 63/145; H04L 63/0428
USPC ............................................. 726/23; 713/188
See application file for complete search history.

(56) References Cited

U.S. PATENT DOCUMENTS

| | | | |
|---|---|---|---|
| 4,292,580 A | 9/1981 | Ott et al. | |
| 5,175,732 A | 12/1992 | Hendel et al. | |
| 5,440,723 A | 8/1995 | Arnold et al. | |
| 5,657,473 A | 8/1997 | Killean et al. | |
| 5,842,002 A | 11/1998 | Schnurer et al. | |
| 5,978,917 A | 11/1999 | Chi | |
| 6,088,803 A | 7/2000 | Tso et al. | |
| 6,094,677 A | 7/2000 | Capek et al. | |
| 6,269,330 B1 | 7/2001 | Cidon et al. | |
| 6,279,113 B1 | 8/2001 | Vaidya | |
| 6,298,445 B1 | 10/2001 | Shostack | |
| 6,357,008 B1 | 3/2002 | Nachenberg | |
| 6,424,627 B1 | 7/2002 | Sorhaug et al. | |
| 6,484,315 B1 | 11/2002 | Ziese | |
| 6,487,666 B1 | 11/2002 | Shanklin et al. | |
| 6,493,756 B1 | 12/2002 | O'Brien et al. | |
| 6,550,012 B1 | 4/2003 | Villa et al. | |
| 6,775,657 B1 | 8/2004 | Baker | |
| 6,832,367 B1 | 12/2004 | Choi et al. | |
| 6,895,550 B2 | 5/2005 | Kanchirayappa et al. | |

(Continued)

FOREIGN PATENT DOCUMENTS

| | | |
|---|---|---|
| GB | 2439806 | 1/2008 |
| WO | WO-02/06928 | 1/2002 |

(Continued)

OTHER PUBLICATIONS

Chrysanthou Yiannis (Modern Password Cracking: A hands-on approach to creating an optimised and versatile attack. Technical Report RHUL—MA—2013—7, May 1, 2013, 65 pages).*

(Continued)

*Primary Examiner* — Oleg Korsak
(74) *Attorney, Agent, or Firm* — Rutan & Tucker, LLP

(57) ABSTRACT

Phishing detection techniques for predicting a password for decrypting an attachment for the purpose of malicious content detection are described herein. According to one embodiment, in response to a communication message, as such an electronic mail (email) message having an encrypted attachment, content of the communication message is parsed to predict a password based on a pattern of the content. The encrypted attachment is then decrypted using the predicted password to generate a decrypted attachment. Thereafter, a malicious content analysis is performed on the decrypted attachment to determine a likelihood as to whether the decrypted attachment contains malicious content.

31 Claims, 6 Drawing Sheets

(56) References Cited

U.S. PATENT DOCUMENTS

| | | | |
|---|---|---|---|
| 6,898,632 B2 | 5/2005 | Gordy et al. | |
| 6,907,396 B1 | 6/2005 | Muttik et al. | |
| 6,981,279 B1 | 12/2005 | Arnold et al. | |
| 7,007,107 B1 | 2/2006 | Ivchenko et al. | |
| 7,028,179 B2 | 4/2006 | Anderson et al. | |
| 7,043,757 B2 | 5/2006 | Hoefelmeyer et al. | |
| 7,069,316 B1 | 6/2006 | Gryaznov | |
| 7,080,408 B1 | 7/2006 | Pak et al. | |
| 7,093,002 B2 | 8/2006 | Wolff et al. | |
| 7,093,239 B1 | 8/2006 | van der Made | |
| 7,100,201 B2 | 8/2006 | Izatt | |
| 7,159,149 B2 | 1/2007 | Spiegel et al. | |
| 7,231,667 B2 | 6/2007 | Jordan | |
| 7,240,364 B1 | 7/2007 | Branscomb et al. | |
| 7,240,368 B1 | 7/2007 | Roesch et al. | |
| 7,287,278 B2 | 10/2007 | Liang | |
| 7,308,716 B2 | 12/2007 | Danford et al. | |
| 7,356,736 B2 | 4/2008 | Natvig | |
| 7,386,888 B2 | 6/2008 | Liang et al. | |
| 7,392,542 B2 | 6/2008 | Bucher | |
| 7,418,729 B2 | 8/2008 | Szor | |
| 7,428,300 B1 | 9/2008 | Drew et al. | |
| 7,441,272 B2 | 10/2008 | Durham et al. | |
| 7,448,084 B1 | 11/2008 | Apap et al. | |
| 7,458,098 B2 | 11/2008 | Judge et al. | |
| 7,464,404 B2 | 12/2008 | Carpenter et al. | |
| 7,464,407 B2 | 12/2008 | Nakae et al. | |
| 7,467,408 B1 | 12/2008 | O'Toole, Jr. | |
| 7,480,773 B1 | 1/2009 | Reed | |
| 7,487,543 B2 | 2/2009 | Arnold et al. | |
| 7,496,960 B1 | 2/2009 | Chen et al. | |
| 7,496,961 B2 | 2/2009 | Zimmer et al. | |
| 7,519,990 B1 | 4/2009 | Xie | |
| 7,523,493 B2 | 4/2009 | Liang et al. | |
| 7,530,104 B1 | 5/2009 | Thrower et al. | |
| 7,540,025 B2 | 5/2009 | Tzadikario | |
| 7,565,550 B2 | 7/2009 | Liang et al. | |
| 7,603,715 B2 | 10/2009 | Costa et al. | |
| 7,607,171 B1 | 10/2009 | Marsden et al. | |
| 7,639,714 B2 | 12/2009 | Stolfo et al. | |
| 7,644,441 B2 | 1/2010 | Schmid et al. | |
| 7,676,841 B2 | 3/2010 | Sobchuk et al. | |
| 7,698,548 B2 | 4/2010 | Shelest et al. | |
| 7,707,633 B2 | 4/2010 | Danford et al. | |
| 7,779,463 B2 | 8/2010 | Stolfo et al. | |
| 7,784,097 B1 | 8/2010 | Stolfo et al. | |
| 7,832,008 B1 | 11/2010 | Kraemer | |
| 7,849,506 B1 | 12/2010 | Dansey et al. | |
| 7,869,073 B2 | 1/2011 | Oshima | |
| 7,877,803 B2 | 1/2011 | Enstone et al. | |
| 7,904,959 B2 | 3/2011 | Sidiroglou et al. | |
| 7,908,660 B2 | 3/2011 | Bahl | |
| 7,930,738 B1 | 4/2011 | Petersen | |
| 7,937,761 B1 | 5/2011 | Benett | |
| 7,996,556 B2 | 8/2011 | Raghavan et al. | |
| 7,996,836 B1 | 8/2011 | McCorkendale et al. | |
| 7,996,905 B2 | 8/2011 | Arnold et al. | |
| 8,006,305 B2 | 8/2011 | Aziz | |
| 8,010,667 B2 | 8/2011 | Zhang et al. | |
| 8,020,206 B2 | 9/2011 | Hubbard et al. | |
| 8,028,338 B1 | 9/2011 | Schneider et al. | |
| 8,042,184 B1 * | 10/2011 | Batenin | 726/24 |
| 8,045,094 B2 | 10/2011 | Teragawa | |
| 8,045,458 B2 | 10/2011 | Alperovitch et al. | |
| 8,069,484 B2 | 11/2011 | McMillan et al. | |
| 8,087,086 B1 | 12/2011 | Lai et al. | |
| 8,171,553 B2 | 5/2012 | Aziz et al. | |
| 8,201,246 B1 | 6/2012 | Wu et al. | |
| 8,204,984 B1 * | 6/2012 | Aziz et al. | 709/224 |
| 8,220,055 B1 | 7/2012 | Kennedy | |
| 8,225,288 B2 | 7/2012 | Miller et al. | |
| 8,225,373 B2 | 7/2012 | Kraemer | |
| 8,233,882 B2 | 7/2012 | Rogel | |
| 8,234,709 B2 | 7/2012 | Viljoen et al. | |
| 8,239,944 B1 | 8/2012 | Nachenberg et al. | |
| 8,286,251 B2 | 10/2012 | Eker et al. | |
| 8,291,499 B2 | 10/2012 | Aziz et al. | |
| 8,307,435 B1 | 11/2012 | Mann et al. | |
| 8,307,443 B2 | 11/2012 | Wang et al. | |
| 8,312,545 B2 | 11/2012 | Tuvell et al. | |
| 8,321,936 B1 | 11/2012 | Green et al. | |
| 8,321,941 B2 | 11/2012 | Tuvell et al. | |
| 8,365,286 B2 | 1/2013 | Poston | |
| 8,370,938 B1 | 2/2013 | Daswani et al. | |
| 8,370,939 B2 | 2/2013 | Zaitsev et al. | |
| 8,375,444 B2 | 2/2013 | Aziz et al. | |
| 8,381,299 B2 | 2/2013 | Stolfo et al. | |
| 8,402,529 B1 | 3/2013 | Green et al. | |
| 8,510,827 B1 | 8/2013 | Leake et al. | |
| 8,510,842 B2 | 8/2013 | Amit et al. | |
| 8,516,593 B2 | 8/2013 | Aziz | |
| 8,528,086 B1 | 9/2013 | Aziz | |
| 8,539,582 B1 | 9/2013 | Aziz et al. | |
| 8,549,638 B2 | 10/2013 | Aziz | |
| 8,561,177 B1 | 10/2013 | Aziz et al. | |
| 8,566,946 B1 | 10/2013 | Aziz et al. | |
| 8,584,094 B2 | 11/2013 | Dadhia et al. | |
| 8,584,234 B1 | 11/2013 | Sobel et al. | |
| 8,584,239 B2 | 11/2013 | Aziz et al. | |
| 8,595,834 B2 | 11/2013 | Xie et al. | |
| 8,627,476 B1 | 1/2014 | Satish | |
| 8,635,696 B1 | 1/2014 | Aziz | |
| 8,713,681 B2 | 4/2014 | Silberman et al. | |
| 2001/0005889 A1 | 6/2001 | Albrecht | |
| 2001/0047326 A1 | 11/2001 | Broadbent et al. | |
| 2002/0018903 A1 | 2/2002 | Kokubo et al. | |
| 2002/0038430 A1 | 3/2002 | Edwards et al. | |
| 2002/0091819 A1 | 7/2002 | Melchione et al. | |
| 2002/0144156 A1 | 10/2002 | Copeland, III | |
| 2002/0162015 A1 | 10/2002 | Tang | |
| 2002/0166063 A1 | 11/2002 | Lachman et al. | |
| 2002/0169952 A1 * | 11/2002 | DiSanto et al. | 713/150 |
| 2002/0184528 A1 | 12/2002 | Shevenell et al. | |
| 2002/0188887 A1 | 12/2002 | Largman et al. | |
| 2002/0194490 A1 | 12/2002 | Halperin et al. | |
| 2003/0074578 A1 | 4/2003 | Ford et al. | |
| 2003/0084318 A1 | 5/2003 | Schertz | |
| 2003/0115483 A1 | 6/2003 | Liang | |
| 2003/0188190 A1 | 10/2003 | Aaron et al. | |
| 2003/0200460 A1 | 10/2003 | Morota et al. | |
| 2003/0212902 A1 | 11/2003 | Van Der Made | |
| 2003/0237000 A1 | 12/2003 | Denton et al. | |
| 2004/0003323 A1 | 1/2004 | Bennett et al. | |
| 2004/0015712 A1 | 1/2004 | Szor | |
| 2004/0019832 A1 | 1/2004 | Arnold et al. | |
| 2004/0047356 A1 | 3/2004 | Bauer | |
| 2004/0083408 A1 | 4/2004 | Spiegel et al. | |
| 2004/0093513 A1 | 5/2004 | Cantrell et al. | |
| 2004/0111531 A1 | 6/2004 | Staniford et al. | |
| 2004/0165588 A1 | 8/2004 | Pandya | |
| 2004/0236963 A1 | 11/2004 | Danford et al. | |
| 2004/0243349 A1 | 12/2004 | Greifeneder et al. | |
| 2004/0249911 A1 | 12/2004 | Alkhatib et al. | |
| 2004/0255161 A1 | 12/2004 | Cavanaugh | |
| 2004/0268147 A1 | 12/2004 | Wiederin et al. | |
| 2005/0021740 A1 | 1/2005 | Bar et al. | |
| 2005/0033960 A1 | 2/2005 | Vialen et al. | |
| 2005/0033989 A1 | 2/2005 | Poletto et al. | |
| 2005/0050148 A1 | 3/2005 | Mohammadioun et al. | |
| 2005/0086523 A1 | 4/2005 | Zimmer et al. | |
| 2005/0091513 A1 | 4/2005 | Mitomo et al. | |
| 2005/0091533 A1 | 4/2005 | Omote et al. | |
| 2005/0114663 A1 | 5/2005 | Cornell et al. | |
| 2005/0125195 A1 | 6/2005 | Brendel | |
| 2005/0157662 A1 | 6/2005 | Bingham et al. | |
| 2005/0183143 A1 | 8/2005 | Anderholm et al. | |
| 2005/0201297 A1 | 9/2005 | Peikari | |
| 2005/0210533 A1 | 9/2005 | Copeland et al. | |
| 2005/0238005 A1 | 10/2005 | Chen et al. | |
| 2005/0265331 A1 | 12/2005 | Stolfo | |
| 2006/0010495 A1 | 1/2006 | Cohen et al. | |
| 2006/0015715 A1 | 1/2006 | Anderson | |
| 2006/0015747 A1 * | 1/2006 | Van de Ven | 713/188 |
| 2006/0021054 A1 | 1/2006 | Costa et al. | |

(56) References Cited

U.S. PATENT DOCUMENTS

| | | |
|---|---|---|
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0094730 A1 | 4/2007 | Bhikkaji et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0271446 A1 | 11/2007 | Nakamura |
| 2008/0005782 A1* | 1/2008 | Aziz ................ G06F 9/45537 726/3 |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184373 A1 | 7/2008 | Traut et al. |
| 2008/0189787 A1 | 8/2008 | Arnold et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0320594 A1 | 12/2008 | Jiang |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0044024 A1 | 2/2009 | Oberheide et al. |
| 2009/0044274 A1 | 2/2009 | Budko et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko |
| 2009/0133125 A1 | 5/2009 | Choi et al. |
| 2009/0158430 A1 | 6/2009 | Borders |
| 2009/0187992 A1 | 7/2009 | Poston |
| 2009/0193293 A1 | 7/2009 | Stolfo et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0017546 A1 | 1/2010 | Poo et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0192223 A1 | 7/2010 | Ismael et al. |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2011/0025504 A1 | 2/2011 | Lyon et al. |
| 2011/0041179 A1 | 2/2011 | Stahlberg |
| 2011/0047594 A1 | 2/2011 | Mahaffey et al. |
| 2011/0047620 A1 | 2/2011 | Mahaffey et al. |
| 2011/0078794 A1 | 3/2011 | Manni et al. |
| 2011/0093951 A1 | 4/2011 | Aziz |
| 2011/0099633 A1 | 4/2011 | Aziz |
| 2011/0113231 A1 | 5/2011 | Kaminsky |
| 2011/0145920 A1 | 6/2011 | Mahaffey et al. |
| 2011/0167494 A1 | 7/2011 | Bowen et al. |
| 2011/0247072 A1 | 10/2011 | Staniford et al. |
| 2011/0265182 A1 | 10/2011 | Peinado et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0079596 A1 | 3/2012 | Thomas et al. |
| 2012/0084859 A1 | 4/2012 | Radinsky et al. |
| 2012/0117652 A1 | 5/2012 | Manni et al. |
| 2012/0174186 A1 | 7/2012 | Aziz et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0216046 A1* | 8/2012 | McDougal ............. G06F 21/56 713/183 |
| 2012/0222121 A1 | 8/2012 | Staniford et al. |
| 2012/0278886 A1 | 11/2012 | Luna |
| 2012/0297489 A1 | 11/2012 | Dequevy |
| 2012/0330801 A1 | 12/2012 | McDougal et al. |
| 2013/0036472 A1 | 2/2013 | Aziz |
| 2013/0047257 A1 | 2/2013 | Aziz |
| 2013/0097706 A1 | 4/2013 | Titonis et al. |
| 2013/0160130 A1 | 6/2013 | Mendelev et al. |
| 2013/0160131 A1 | 6/2013 | Madou et al. |
| 2013/0227691 A1 | 8/2013 | Aziz et al. |
| 2013/0246370 A1 | 9/2013 | Bartram |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2014/0053260 A1 | 2/2014 | Gupta et al. |
| 2014/0053261 A1 | 2/2014 | Gupta et al. |
| 2014/0215617 A1* | 7/2014 | Smith ................ H04L 63/1441 726/23 |

(56) References Cited

U.S. PATENT DOCUMENTS

FOREIGN PATENT DOCUMENTS

| WO | WO-02/23805 | 3/2002 |
|---|---|---|
| WO | WO-2007-117636 | 10/2007 |
| WO | WO-2008/041950 | 4/2008 |
| WO | WO-2011/084431 | 7/2011 |
| WO | WO-2012145066 | 10/2012 |

OTHER PUBLICATIONS

Aufwind (Finding words after keyword in python, stackoverflow. com, Jul. 9, 2011, 2 pages).*
Middus et al. (function that highlight a word and extract the text near it, Stack Overflow, 2 pages, Oct. 26, 2011).*
IEEE Xplore Digital Library Sear Results for "detection of unknown computer worms". Http//ieeexplore.ieee.org/searchresult. jsp?SortField=Score&SortOrder=desc&ResultC . . . , (Accessed on Aug. 28, 2009).
AltaVista Advanced Search Results. "Event Orchestrator". Http:// www.altavista.com/web/results?Itag=ody&pg=aq &aqmode=aqa=Event+Orchestrator . . . , (Accessed on Sep. 3, 2009).
AltaVista Advanced Search Results. "attack vector identifier". Http://www.altavista.com/web/results?Itag=ody&pg=aq &aqmode=aqa=Event+Orchestrator . . . , (Accessed on Sep. 15, 2009).
Cisco, Configuring the Catalyst Switched Port Analyzer (SPAN) ("Cisco"),(1992-2003).
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Excerpt regarding First Printing Date for Merike Kaeo, Designing Network Security.("Kaeo"), (2005).
The Sniffers's Guide to Raw Traffic available at: yuba.stanford. edu/~casado/pcap/section1.html, (Jan. 6, 2014).
"Network Security: NetDetector~Network Intrusion Forensic System (NIFS) Whitepaper", "NetDetector Whitepaper"), (2003).
"Packet", Microsoft Computer Dictionary, Microsoft Press, (Mar. 2002), 1 page.
"When Virtual is Better Than Real", IEEEXplore Digital Library, available at, http://ieeexplore.ieee.org/xpl/articleDetails. jsp?reload=true&arnumber=990073, (Dec. 7, 2014).
Abdullah, et al., Visualizing Network Data for Intrusion Detection, 2005 IEEE Workshop on Information Assurance and Security, pp. 100-108.
Adetoye, Adedayo , et al., "Network Intrusion Detection & Response System", ("Adetoye"), (Sep. 2003).
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists.org/honeypots2003/q2319 ("Boubalos"), (Jun. 5, 2003).
Chaudet, C. , et al., ""Optimal Positioning of Active and Passive Monitoring Devices, International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Cohen, M.I. , "PyFlag—An advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).

Crandall, J.R. , et al., "Minos:Control Data Attack Prevention Orthogonal to Memory Model", 37th International Symposium on Microarchitecture, Portland, Oregon, (Dec. 2004).
Deutsch, P. , "Zlib compressed data format specification version 3.3" RFC 1950, (1996).
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
Filiol, Eric , et al., "Combinatorial Optimisation of Worm Propagation on an Unknown Network", International Journal of Computer Science 2.2 (2007).
Goel, et al., Reconstructing System State for Intrusion Analysis, Apr. 2008 SIGOPS Operating Systems Review, vol. 42 Issue 3, pp. 21-28.
Hjelmvik, Erik , "Passive Network Security Analysis with NetworkMiner", (In)Secure, Issue 18, (Oct. 2008), pp. 1-100.
Kaeo, Merike , "Designing Network Security", ("Kaeo"), (Nov. 2003).
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King").
Krasnyansky, Max , et al., Universal TUN/TAP driver, available at https://www.kernel.org/doc/Documentation/networking/tuntap.txt (2002) ("Krasnyansky").
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Liljenstam, Michael , et al., "Simulating Realistic Network Traffic for Worm Warning System Design and Testing", Institute for Security Technology studies, Dartmouth College, ("Liljenstam"), (Oct. 27, 2003).
Marchette, David J., "Computer Intrusion Detection and Network Monitoring: A Statistical Viewpoint", ("Marchette"), (2001).
Margolis, P.E. , "Random House Webster's 'Computer & Internet Dictionary 3rd Edition'", ISBN 0375703519, (Dec. 1998).
Moore, D. , et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Natvig, Kurt , "SandboxII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Newsome, J. , et al., "Polygraph: Automatically Generating Signatures for Polymorphic Worms", In Proceedings of the IEEE Symposium on Security and Privacy, (May 2005).
Nojiri, D. , et al., "Cooperation Response Strategies for Large Scale Attack Mitigation", DARPA Information Survivability Conference and Exposition, vol. 1, (Apr. 22-24, 2003), pp. 293-302.
Peter M. Chen, and Brian D. Noble , "When Virtual is Better Than Real, Department of Electrical Engineering and Computer Science", University of Michigan ("Chen").
Silicon Defense, "Worm Containment in the Internal Network", (Mar. 2003), pp. 1-25.
Singh, S. , et al., "Automated Worm Fingerprinting", Proceedings of the ACM/USENIX Symposium on Operating System Design and Implementation, San Francisco, California, (Dec. 2004).
Spitzner, Lance , "Honeypots: Tracking Hackers", ("Spizner"), (Sep. 17, 2002).

(56) References Cited

OTHER PUBLICATIONS

Thomas H. Ptacek, and Timothy N. Newsham, "Insertion, Evasion, and Denial of Service: Eluding Network Intrusion Detection", *Secure Networks*, ("Ptacek"), (Jan. 1998).

Venezia, Paul, "NetDetector Captures Intrusions", *InfoWorld Issue 27*, ("Venezia"), (Jul. 14, 2003).

Whyte, et al., "DNS-Based Detection of Scanning Works in an Enterprise Network", *Proceedings of the 12th Annual Network and Distributed System Security Symposium*, (Feb. 2005), 15 pages.

Williamson, Matthew M., "Throttling Viruses: Restricting Propagation to Defeat Malicious Mobile Code", *ACSAC Conference*, Las Vegas, NV, USA, (Dec. 2002), pp. 1-9.

\* cited by examiner

SYSTEM AND METHOD FOR DETECTING PHISHING USING PASSWORD PREDICTION

FIELD OF THE INVENTION

Embodiments of the present invention relate generally to malicious content detection. More particularly, embodiments of the invention relate to detecting phishing activity based on predicting a password for decrypting an electronic attachment provided as part of a communication message for malicious content detection.

BACKGROUND

Malicious software, or malware for short, may include any program or file that is harmful by design to a computer. Malware includes computer viruses, worms, Trojan horses, adware, spyware, and any programming that gathers information about a computer or its user or otherwise operates without permission. The owners of the computers are often unaware that these programs have been added to their computers and are often similarly unaware of their function.

Malicious network content is a type of malware distributed over a network via websites, e.g., servers operating on a network according to a hypertext transfer protocol (HTTP) standard or other well-known standard. Malicious network content distributed in this manner may be actively downloaded and installed on a computer, without the approval or knowledge of its user, simply by the computer accessing the web site hosting the malicious network content (the "malicious web site"). Malicious network content may be embedded within objects associated with web pages hosted by the malicious web site. Malicious network content may also enter a computer on receipt or opening of email. For example, email may contain an attachment, such as a PDF document, with embedded malicious executable programs. Furthermore, malicious content may exist in files contained in a computer memory or storage device, having infected those files through any of a variety of attack vectors.

Various processes and devices have been employed to prevent the problems associated with malicious content. For example, computers often run antivirus scanning software that scans a particular computer for viruses and other forms of malware. The scanning typically involves automatic detection of a match between content stored on the computer (or attached media) and a library or database of signatures of known malware. The scanning may be initiated manually or based on a schedule specified by a user or system administrator associated with the particular computer. Unfortunately, by the time malware is detected by the scanning software, some damage on the computer or loss of privacy may have already occurred, and the malware may have propagated from the infected computer to other computers. Additionally, it may take days or weeks for new signatures to be manually created, the scanning signature library updated and received for use by the scanning software, and the new signatures employed in new scans.

Moreover, anti-virus scanning utilities may have limited effectiveness to protect against all exploits by polymorphic malware. Polymorphic malware has the capability to mutate to defeat the signature match process while keeping its original malicious capabilities intact. Signatures generated to identify one form of a polymorphic virus may not match against a mutated form. Thus polymorphic malware is often referred to as a family of virus rather than a single virus, and improved anti-virus techniques to identify such malware families is desirable.

Another type of malware detection solution employs virtual environments to replay content within a sandbox established by virtual machines (VMs). Such solutions monitor the behavior of content during execution to detect anomalies that may signal the presence of malware. One such system offered by FireEye, Inc., the assignee of the present patent application, employs a two-phase malware detection approach to detect malware contained in network traffic monitored in real-time. In a first or "static" phase, a heuristic is applied to network traffic to identify and filter packets that appear suspicious in that they exhibit characteristics associated with malware. In a second or "dynamic" phase, the suspicious packets (and typically only the suspicious packets) are replayed within one or more virtual machines. For example, if a user is trying to download a file over a network, the file is extracted from the network traffic and analyzed in the virtual machine. The results of the analysis aids in determining whether the file is malicious. The two-phase malware detection solution may detect numerous types of malware and, even malware missed by other commercially available approaches. Through verification, the two-phase malware detection solution may also achieve a significant reduction of false positives relative to such other commercially available approaches. Dealing with false positives in malware detection may needlessly slow or interfere with download of network content or receipt of email, for example. This two-phase approach has even proven successful against many types of polymorphic malware and other forms of advanced persistent threats.

In some situations, malicious content comes in a form of encrypted attachment to an email. In order to perform a malicious content analysis on the attachment, it has to be decrypted first. Conventional malware detection systems cannot perform malware detection without a necessary password because the content has been encrypted.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
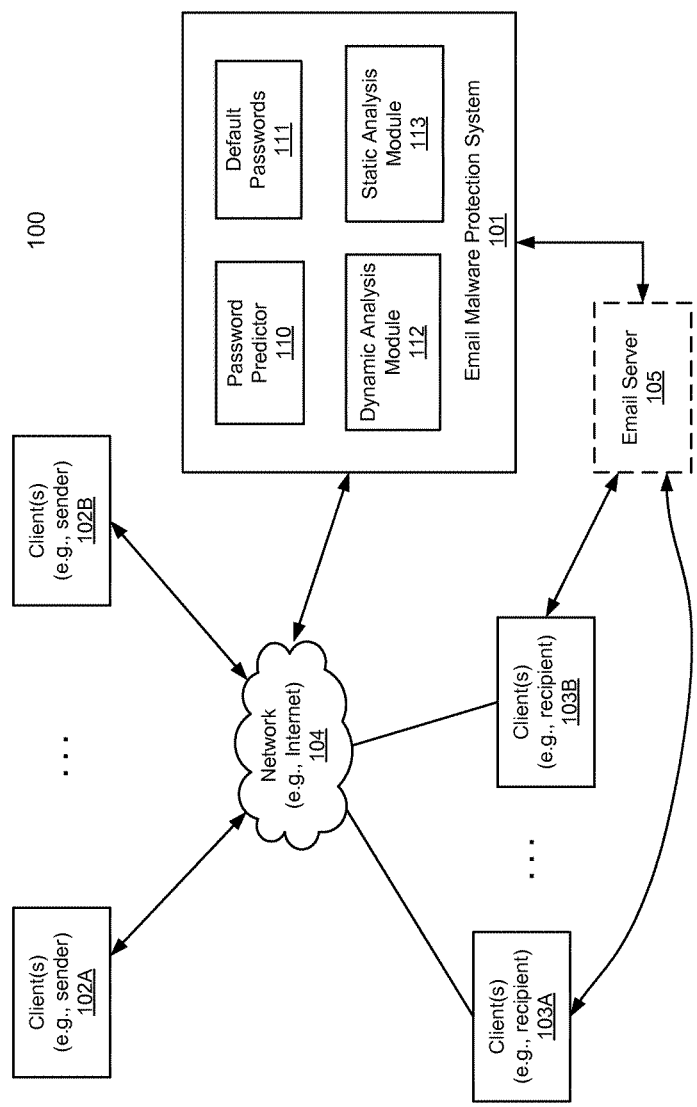
FIG. 1 is a block diagram illustrating a network system for email malware detection system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. Also, the term "email" generally denotes a communication message being digital data with a particular format such as one or more packet(s), frame(s), or any other series of bits having a prescribed format, which may include, but not limited or restricted to an electronic mail message, an instant message (IM), or another type of communication message.

Aspects of the invention are directed to detecting phishing activity in the form of communication messages, which include malicious content within easily decrypted attachments and are generated to leverage social relationships of trust between a targeted recipient and an apparent sender. The social relationship and apparent encryption of a message is desired to encourage the sender to decrypt the attachment and cause malware to be uploaded and installed on the recipient's computer system or electronic device. Illustrative techniques for detecting phishing activity involves predicting a password for decrypting an attachment for the purpose of malicious content detection are described herein.

Often, malware writers attach encrypted attachments to a communication message generally referred to as an "email" (e.g., an electronic mail message or an instant message, etc.) with a view to enticing a particular recipient to open and decrypt the attachment, thereby releasing a malicious executable or other malware within the recipient's computer system or device. The malware writers often rely on a social relationship of trust between the apparent (though usually not actual) "sender" of the email and the recipient to make it appear that it is safe to open the attachment. For example, the relationship may be familial or a work relationship. Accordingly, the encryption of the attachment is not intended to actually protect the attachment content, but rather to use the encryption to lull the recipient into believing the attachment is safe to open. In addition, malware authors often provide the password explicitly within the body of the email itself or at least provide hints or clues to the recipient to make the password obvious from the content so as to facilitate decryption by the recipient. To detect malware within the "faux" encrypted attachment by a malware detection system, embodiments of the invention take advantage of this tendency (or trick) of malware authors to use the included or "hinted at" password within a malware detection system to decrypt the attachment and then detect the embedded malware. After decryption, a malware detection system equipped in this way may monitor the behavior the malware, and generate signatures for detection of malware in other email traffic.

According to one embodiment, when an email having an attachment is received, the attachment is examined to determine whether the attachment has been encrypted. If the attachment has been encrypted, a list of default passwords is used in an attempt to decrypt the attachment. The list of default passwords may be those commonly used by ordinary users in the world, which may be collected and distributed periodically. If the attachment can be decrypted using the default passwords, a content analysis is performed on the decrypted content to determine whether the attached content likely contains malicious content.

If the attachment cannot be decrypted using any of the default passwords, according to one embodiment, a password predictor is invoked to parse the email to locate any possible passwords hints within various portions of the email (e.g. body, subject line, address line, etc.) and attempt to determine or predict one or more password candidates. The password candidates may be determined based on certain content or password patterns (e.g., text phrases) or certain metadata (e.g., domain, addresses) of the email. The password candidates are then used in an attempt to decrypt the encrypted attachment. If the encrypted attachment can be decrypted using any of the password candidates, a content analysis (e.g., static analysis and/or dynamic analysis) is performed on the decrypted attachment. As a result, at least some encrypted content can be analyzed for malware detection. Behavior of execution of the decrypted attachment is then monitored and new malware signatures may be generated for future detection. Alternatively, content of the email may be scanned and analyzed prior to applying the list of default passwords to predict the password. Furthermore, the above mentioned multiple password prediction approaches may be performed individually or in combination, in series or in parallel with no particular order or sequence.

FIG. 1 is a block diagram illustrating a network system for email malware detection system according to one embodiment of the invention. Referring to FIG. 1, system 100 includes an email malware detection system or EMDS 101 (also referred to as an email malware protection system or EMPS) that may be deployed as at various locations of various local area networks (LANs), e.g., of a corporate entity. EMDS 101 may be configured to monitor and/or intercept any email traffic amongst clients 102A-102B and 103A-103B over network 104 and to detect whether an email contains malicious content (e.g., a malicious executable as an attachment to an email). For example, EMDS 101 may be deployed as, as a standalone malware detection system, part of a firewall of a local network or alternatively, EMDS 101 may be implemented as part of a network gateway, router, switch, and/or an access point. If an email is determined to be a malicious email, it may be quarantined and may not be delivered to the intended recipient(s). Clients 102-103 may represent any computing nodes, such as, for example, servers, desktops, laptops, tablets, mobile devices, etc. Network 104 may be a wide area network (WAN), a LAN, or a combination thereof.

According to one embodiment, in response to an email having an attachment received from an email sender (e.g., clients 102) to be delivered to a recipient (e.g., clients 103), EMDS 101 is configured to determine whether the attachment has been encrypted by a password. If the attachment is not encrypted, the attachment is then extracted from the email and a content analysis may be performed on the extracted attachment, for example, by dynamic analysis module 112 and/or static analysis module 113 for dynamic content analysis (also referred to a behavioral analysis) and/or static analysis, respectively.

If the attachment has been encrypted, a list of default passwords 111 is used in an attempt to decrypt the attachment. The list of default passwords 111 may be those commonly used by ordinary users in the world and collected based on prior analysis over a period of time. If the attachment can be decrypted using the default passwords 111, the content analysis is performed, for example, by dynamic analysis module 112 and/or static analysis module 113, on the decrypted content to determine whether the attached content likely contains malicious content.

If the attachment cannot be decrypted using the default passwords 111, according to one embodiment, a password predictor 110 is invoked to parse the email to locate or identify any possible passwords hints within the email and attempt to determine or predict one or more password candidates. As described above, a sender of the email may provide obvious hints of a password that can be used to decrypt the encrypted attachment to lull the recipient of the email to believe that the attachment is safe to decrypt, giving certain information (e.g., relationship of the sender and recipient) obtained from the email. The purpose of the sender is to convince the recipient to decrypt the attachment using a password provided or hinted by the sender, such that malicious content can be dispatched. Accordingly, an embodiment of the invention is to take advantage of such tendency to predict or determine the password and to decrypt the attachment, such that a malicious content analysis can be performed on the decrypted attachment.

According to one embodiment, the password candidates may be determined based on certain content or password patterns (e.g., text phrases) or certain metadata (e.g., domain, addresses) of the email. The password candidates are then used in an attempt to decrypt the encrypted attachment. If the encrypted attachment can be decrypted using any of the password candidates, the content analysis (e.g., static analysis and/or dynamic analysis) is performed on the decrypted attachment. As a result, at least some encrypted content can be analyzed for malware detection. Once the attachment has been determined not to contain malicious content, the email, as well as the attachment, is then forwarded, for example, via the associated communication (e.g. email, IM, etc.) server 105, to the intended recipient(s) 103A-103B. Otherwise, the email and the attachment may be prevented from being delivered to the intended recipient. Instead, an alert may be generated and sent to an administrator of the local network and/or the intended recipient. Alternatively, only the email is delivered without delivering the attachment and a warning message is displayed to alert the intended recipient(s).

Note that the configuration as shown in FIG. 1 is shown for illustration purposes only. EMDS 101 may be implemented as part of communication server 105. Alternatively, EMDS 101 may be implemented in a distributed fashion, such as for example, in the cloud (e.g., the Internet). Similarly, dynamic analysis module 112 and/or static analysis module 113 may also be deployed in the network. The static analysis and the dynamic analysis may be performed in sequence or in parallel. Also note that throughout this application, techniques have been described to be utilized for encrypted attachment received via an email. However, it is not so limited; the techniques described throughout may also be applied to other situations, such as, file transport protocol (FTP) download of encrypted files, or Web download of encrypted content, etc., where the hints of a password may be discovered or identified based on the network traffic with the particular site or sites (e.g., domain name, IP addresses, uniform resource locator or URL, download or network traffic history) from which the encrypted content is received.

Figure 2:
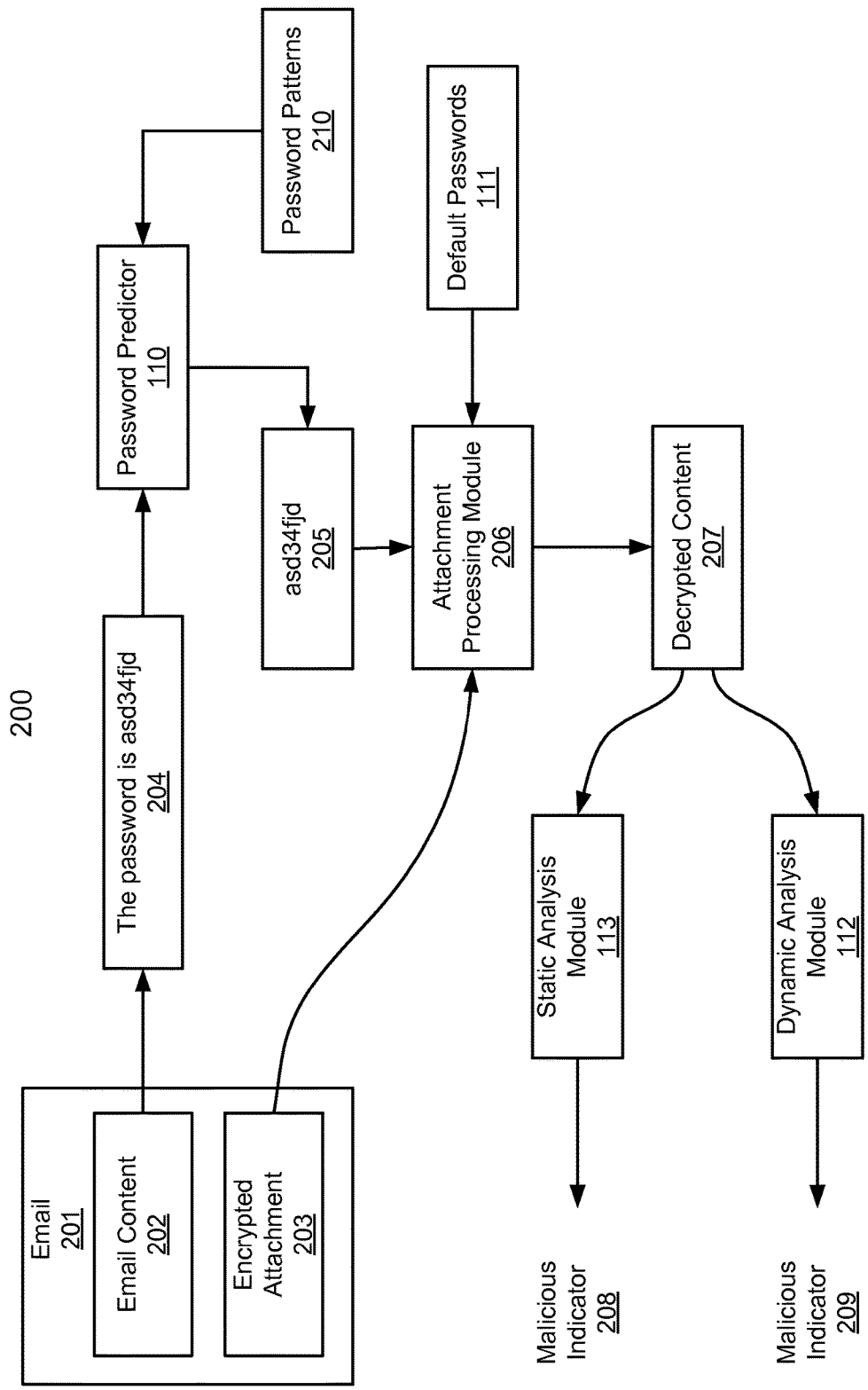
FIG. 2 is a block diagram, partially in flow chart form, illustrating an email malware detection system according to one embodiment of the invention.

FIG. 2 is a block diagram, partially in flow chart form, illustrating an email malware detection system according to one embodiment of the invention. System 200 may be implemented as part of EMDS 101 of FIG. 1. Referring to FIG. 2, in one embodiment, when email 201 having email content 202 and encrypted attachment 203 is received, for example, at an EMDS associated with a local network or an email server, the encrypted attachment 203 may be extracted from email 201. Attachment processing module 206 is configured to apply a list of default passwords 111 to attempt to decrypt encrypted attachment 203. The default passwords 111 may be the commonly used passwords by the ordinary users, which may be determined or collected over a period of time. The default passwords 111 may be periodically updated from a management server over a network based on the ongoing network traffic and/or malware detection processes, for example, performed by many EMDS systems in the cloud.

If encrypted attachment 203 can be decrypted to become decrypted content 207 using default passwords 111, a content analysis is performed on decrypted content 207. In one embodiment, a static content analysis is performed on decrypted content 207 by static analysis module 113, for example, based on heuristics to generate a static malicious indicator or score 208. In addition, a dynamic or behavioral content analysis is performed on decrypted content 207 by dynamic analysis module 112, for example, by replaying decrypted content 207 in an isolated operating environment (e.g., virtual machine or sandboxed environment) and observing behaviors of decrypted content 207 to generate a dynamic malicious indicator or score 209. The indicators or scores 208-209 are then utilized to determine whether decrypted content 207 is mostly likely malicious.

If attachment processing module 206 cannot decrypt the encrypted attachment 203 using default passwords 111, according to one embodiment, attachment processing module 206 invokes password predictor 110 to parse email 201 in an attempt to identify any password candidates based on email content 202 and/or email metadata or attributes, for example, in view of a set of password patterns 210, which may be collected and distributed periodically. An email sender often puts a password for the attachment in the email or uses a password that is closely related to the content or attribute of the email. In one embodiment, password predictor 110 is configured to identify certain commonly used phrases in the email, and based on the identified commonly used phrases, password predictor 110 is configured to identify and extract a password candidate from the nearby content (e.g., texts within a predetermined proximity of a particular phrase.

In one embodiment, if password predictor 110 identifies a phrase 204 from email content 202 that matches a predetermined pattern or template as part of password patterns 210 (in this example, "the password is asd34fjd" that matches a predetermined pattern or template of "the password is"), password predictor 110 may extract the nearby content (in this example, "asd34fjd" that immediately follows the phrase of "the password is") as a password candidate 205. Password candidate 205 is then utilized to decrypt the encrypted content 203 and a content analysis is performed if the encrypted content 203 can be decrypted.

According to some embodiments, password patterns 210 may further include other patterns that may also be utilized to identify password candidates, such as, for example, "password," "pass," "p/w," and "here is the password." In one embodiment, up to a predetermined number (e.g., five) of words before or after the predetermined patterns may be utilized as potential password candidates. Some common words such as pronouns, adjectives, adverbs, and verbs may be excluded from the phrase during the prediction of passwords. Some words between some annotations, such as, for example, "{ }," "[ ]," "( )," single quotes, and double quotes, may be identified as potential password candidates. Furthermore, certain words related to a sender of the email, such as a domain name, may be utilized as at least the hints to predict passwords. Some email metadata or attributes, such as, for example, the FROM, TO, and/or SUBJECT fields of an email, may also be utilized. Certain information of the URLs of the Web download may also be utilized as password candidates. Note that any of the above information may be combined to predict the passwords.

It will be appreciated that the above variety of password approaches can be utilized individually or in combination, in serious or in parallel with any order or sequence. For example, the password prediction based on email content may be performed first prior to applying a list of default passwords. Alternatively, the password prediction operations based on email content, default passwords, and email metadata may be performed in parallel. Also note that password predictor 110 may be implemented in software (e.g., application, device driver, as part of operating system), hardware (e.g., integrated circuit or a processor having machine-executable code running therein), or a combination of thereof.

Figure 3:
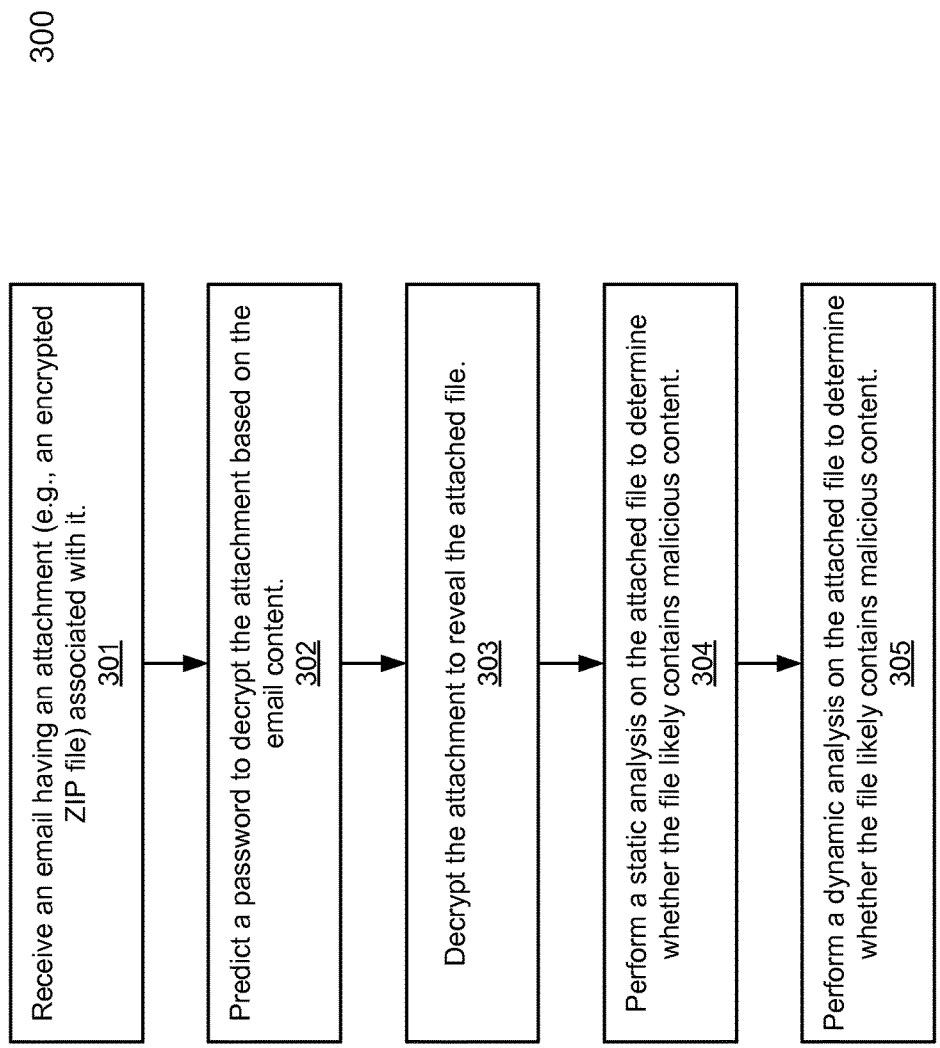
FIG. 3 is a flow diagram illustrating a method for predicting a password for decrypting suspicious content for malware detection according to one embodiment.

FIG. 3 is a flow diagram illustrating a method for predicting a password for decrypting suspicious content for malware detection according to one embodiment. Method 300 may be performed by processing logic which may include software, hardware, or a combination thereof. For example, method 300 may be performed by system 200 of FIG. 2. Referring to FIG. 3, at block 301, an email having an encrypted attachment (e.g., ZIP file) is received. At block 302, processing logic predicts a password to decrypt the encrypted attachment based on email content. A password may be obtained from a list of default passwords or predicted based on the content and/or metadata of the email as described above. At block 303, the predicted password is used to decrypt the attachment. If successful, at block 304, a static content analysis is performed and at block 305, a dynamic content analysis is performed on the decrypted content to determine whether the attachment contains malicious content.

Figure 4:
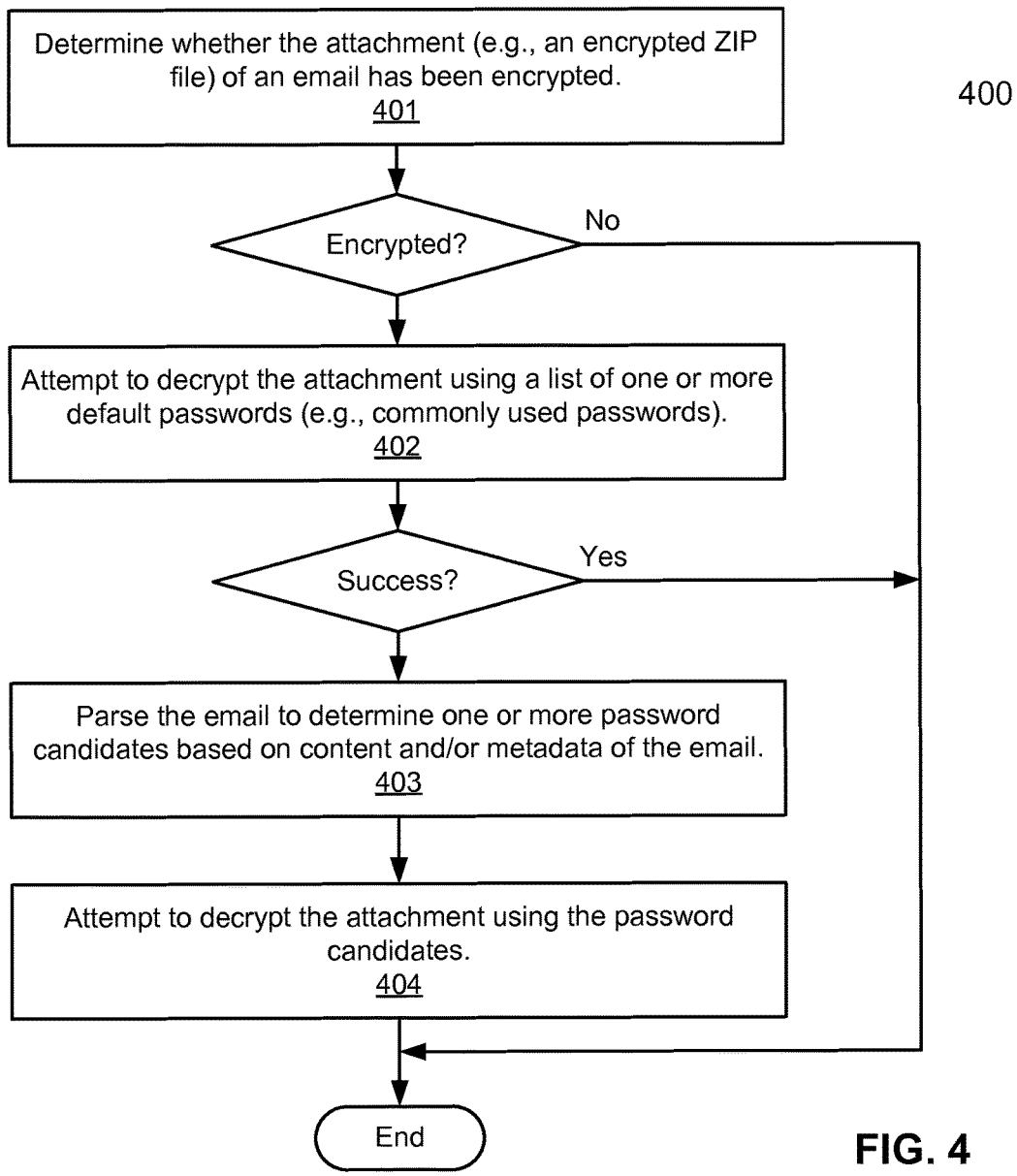
FIG. 4 is a flow diagram illustrating a method for predicting a password for decrypting suspicious content for malware detection according to another embodiment.

FIG. 4 is a flow diagram illustrating a method for predicting a password for decrypting suspicious content for malware detection according to another embodiment. Method 400 may be performed as part of operations involved in block 302 of FIG. 3. Referring to FIG. 4, at block 401, processing logic determines whether an attachment of an email has been encrypted. If the attachment has not been encrypted, a content analysis can be directly performed on the attachment. Otherwise, at block 402, processing logic attempts to decrypt the attachment using a list of one or more default passwords. If the default passwords cannot decrypt the attachment, at block 403, processing logic parses the email, including content and metadata of the email, to determine one or more password candidates. At block 404, the password candidates are used to decrypt the attachment. Note that, as described above, processing logic may perform password prediction based on content and/or metadata of the email prior to applying a list of default passwords. Alternatively, processing logic may utilize some of all of the above approaches in parallel.

Figure 5:
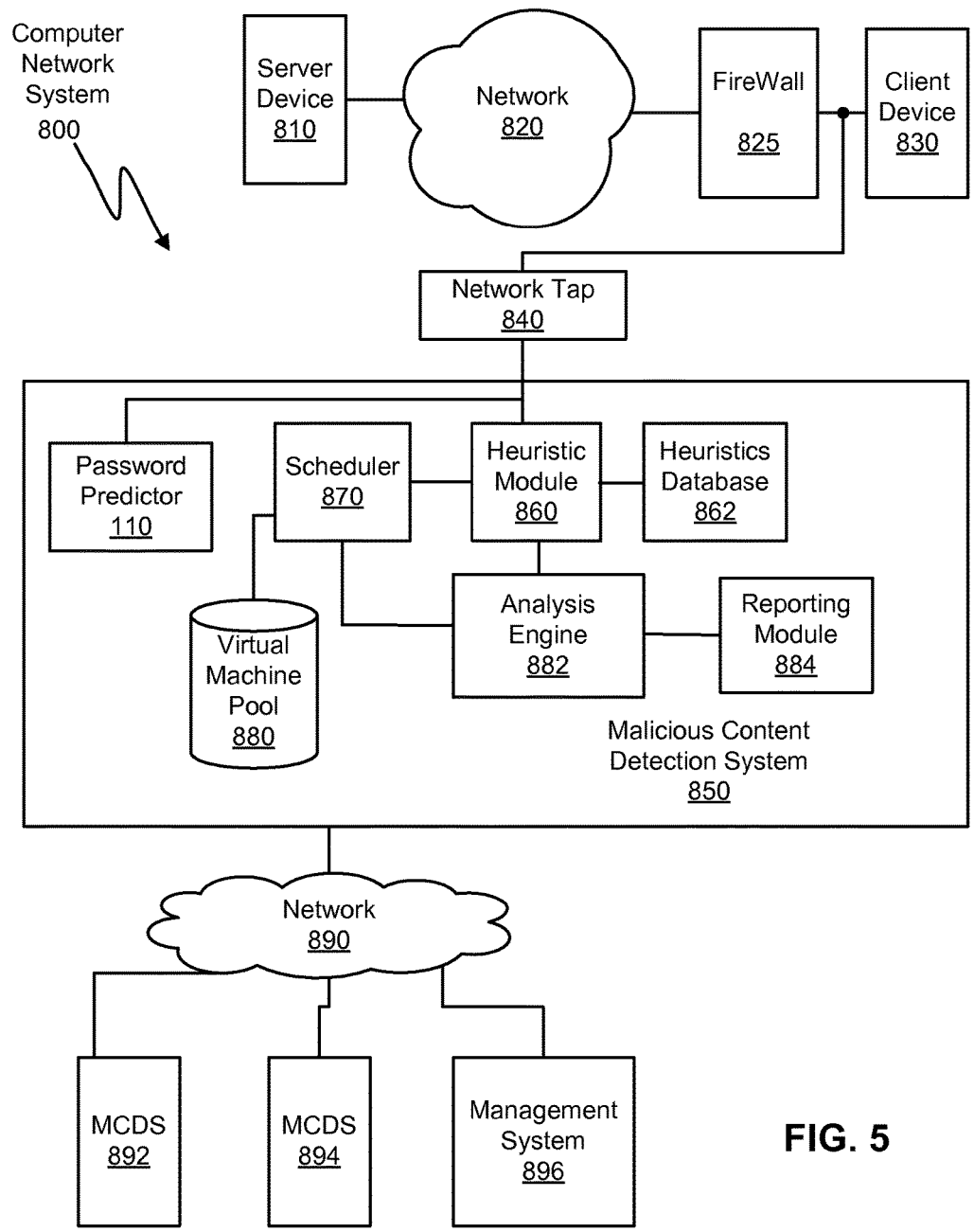
FIG. 5 is a block diagram of a computer network system deploying a malicious content detection system according to one embodiment of the invention.

FIG. 5 is a block diagram of an illustrative computer network system 800 having a malicious content detection system 850 in accordance with a further illustrative embodiment. The malicious content detection system 850 may represent any of the malicious content detection systems described above, such as, for example, detection system 100 of FIG. 1. In one embodiment, malicious content detection system 850 includes password predictor 110. As described above, password predictor 110 is configured to use some or all of the techniques described above to predict or determine a password or passwords of an encrypted attachment of an email using certain password "hints" provided by a sender of the email, where the attachment is intended to be decrypted by a recipient of the email using the obvious password provided by the sender. Password predictor 110 is configured to scan the content of the email to discover the intended password(s) to attempt to decrypt the encrypted attachment. Alternatively, password predictor 110 is configured to determine a password based on email metadata (e.g., domain name of the sender) or using a list of commonly used default passwords.

The malicious content detection system 850 is illustrated with a server device 810 and a client device 830, each coupled for communication via a communication network 820. In various embodiments, there may be multiple server devices and multiple client devices sending and receiving data to/from each other, and the same device can serve as either a server or a client in separate communication sessions. Although FIG. 5 depicts data transmitted from the server device 810 to the client device 830, either device can transmit and receive data from the other.

Note that throughout this application, network content is utilized as an example of content for malicious content detection purposes; however, other types of content can also be applied. Network content may include any data transmitted over a network (i.e., network data). Network data may include text, software, images, audio, or other digital data. An example of network content includes web content, or any network data that may be transmitted using a Hypertext Transfer Protocol (HTTP), Hypertext Markup Language (HTML) protocol, or be transmitted in a manner suitable for display on a Web browser software application. Another example of network content includes email messages, which may be transmitted using an email protocol such as Simple Mail Transfer Protocol (SMTP), Post Office Protocol version 3 (POP3), or Internet Message Access Protocol (IMAP4). A further example of network content includes Instant Messages, which may be transmitted using an Instant Messaging protocol such as Session Initiation Protocol (SIP) or Extensible Messaging and Presence Protocol (XMPP). In addition, network content may include any network data that is transferred using other data transfer protocols, such as File Transfer Protocol (FTP).

The malicious network content detection system 850 may monitor exchanges of network content (e.g., Web content) in real-time rather than intercepting and holding the network content until such time as it can determine whether the network content includes malicious network content. The malicious network content detection system 850 may be configured to inspect exchanges of network content over the communication network 820, identify suspicious network content, and analyze the suspicious network content using a virtual machine to detect malicious network content. In this way, the malicious network content detection system 850 may be computationally efficient and scalable as data traffic volume and the number of computing devices communicating over the communication network 820 increases. Therefore, the malicious network content detection system 850 may not become a bottleneck in the computer network system 800.

The communication network 820 may include a public computer network such as the Internet, in which case a firewall 825 may be interposed between the communication network 820 and the client device 830. Alternatively, the communication network may be a private computer network such as a wireless telecommunication network, wide area network, or local area network, or a combination of networks. Though the communication network 820 may include any type of network and be used to communicate different types of data, communications of web data may be discussed below for purposes of example.

The malicious network content detection system 850 is shown as coupled with the network 820 by a network tap 840 (e.g., a data/packet capturing device). The network tap 840 may include a digital network tap configured to monitor network data and provide a copy of the network data to the malicious network content detection system 850. Network data may comprise signals and data that are transmitted over the communication network 820 including data flows from the server device 810 to the client device 830. In one example, the network tap 840 monitors and copies the network data without an appreciable decline in performance of the server device 810, the client device 830, or the communication network 820. The network tap 840 may copy any portion of the network data, for example, any number of data packets from the network data. In embodiments where the malicious content detection system 850 is implemented as an dedicated appliance or a dedicated computer system, the network tap 840 may include an assembly integrated into the appliance or computer system that includes network ports, network interface card and related logic (not shown) for connecting to the communication network 820 to non-disruptively "tap" traffic thereon and provide a copy of the traffic to the heuristic module 860. In other embodiments, the network tap 840 can be integrated into a firewall, router, switch or other network device (not shown) or can be a standalone component, such as an appropriate commercially available network tap. In virtual environments, a virtual tap (vTAP) can be used to copy traffic from virtual networks.

The network tap 840 may also capture metadata from the network data. The metadata may be associated with the server device 810 and/or the client device 830. For example, the metadata may identify the server device 810 and/or the client device 830. In some embodiments, the server device 810 transmits metadata which is captured by the tap 840. In other embodiments, a heuristic module 860 (described herein) may determine the server device 810 and the client device 830 by analyzing data packets within the network data in order to generate the metadata. The term, "content," as used herein may be construed to include the intercepted network data and/or the metadata unless the context requires otherwise.

The malicious network content detection system 850 may include a heuristic module 860, a heuristics database 862, a scheduler 870, a virtual machine pool 880, an analysis engine 882 and a reporting module 884. In some embodiments, the network tap 840 may be contained within the malicious network content detection system 850.

The heuristic module 860 receives the copy of the network data from the network tap 840 and applies heuristics to the data to determine if the network data might contain suspicious network content. The heuristics applied by the heuristic module 860 may be based on data and/or rules stored in the heuristics database 862. The heuristic module 860 may examine the image of the captured content without executing or opening the captured content. For example, the heuristic module 860 may examine the metadata or attributes of the captured content and/or the code image (e.g., a binary image of an executable) to determine whether a certain portion of the captured content matches a predetermined pattern or signature that is associated with a particular type of malicious content. In one example, the heuristic module 860 flags network data as suspicious after applying a heuristic analysis. This detection process is also referred to as a static malicious content detection. The suspicious network data may then be provided to the scheduler 870. In some embodiments, the suspicious network data is provided directly to the scheduler 870 with or without buffering or organizing one or more data flows.

When a characteristic of the packet, such as a sequence of characters or keyword, is identified that meets the conditions of a heuristic, a suspicious characteristic of the network content is identified. The identified characteristic may be stored for reference and analysis. In some embodiments, the entire packet may be inspected (e.g., using deep packet inspection techniques) and multiple characteristics may be identified before proceeding to the next step. In some embodiments, the characteristic may be determined as a result of an analysis across multiple packets comprising the network content. A score related to a probability that the suspicious characteristic identified indicates malicious network content is determined.

The heuristic module 860 may also provide a priority level for the packet and/or the features present in the packet. The scheduler 870 may then load and configure a virtual machine from the virtual machine pool 880 in an order related to the priority level, and dispatch the virtual machine to the analysis engine 882 to process the suspicious network content.

The heuristic module 860 may provide the packet containing the suspicious network content to the scheduler 870, along with a list of the features present in the packet and the malicious probability scores associated with each of those features. Alternatively, the heuristic module 860 may provide a pointer to the packet containing the suspicious network content to the scheduler 870 such that the scheduler 870 may access the packet via a memory shared with the heuristic module 860. In another embodiment, the heuristic module 860 may provide identification information regarding the packet to the scheduler 870 such that the scheduler 870, or virtual machine may query the heuristic module 860 for data regarding the packet as needed.

The scheduler 870 may identify the client device 830 and retrieve a virtual machine associated with the client device 830. A virtual machine may itself be executable software that is configured to mimic the performance of a device (e.g., the client device 830). The virtual machine may be retrieved from the virtual machine pool 880. Furthermore, the scheduler 870 may identify, for example, a Web browser running on the client device 830, and retrieve a virtual machine associated with the web browser.

In some embodiments, the heuristic module 860 transmits the metadata identifying the client device 830 to the scheduler 870. In other embodiments, the scheduler 870 receives one or more data packets of the network data from the heuristic module 860 and analyzes the one or more data packets to identify the client device 830. In yet other embodiments, the metadata may be received from the network tap 840.

The scheduler 870 may retrieve and configure the virtual machine to mimic the pertinent performance characteristics of the client device 830. In one example, the scheduler 870 configures the characteristics of the virtual machine to mimic only those features of the client device 830 that are affected by the network data copied by the network tap 840. The scheduler 870 may determine the features of the client device 830 that are affected by the network data by receiving and analyzing the network data from the network tap 840. Such features of the client device 830 may include ports that are to receive the network data, select device drivers that are to respond to the network data, and any other devices coupled to or contained within the client device 830 that can respond to the network data. In other embodiments, the heuristic module 860 may determine the features of the client device 830 that are affected by the network data by receiving and analyzing the network data from the network tap 840. The heuristic module 860 may then transmit the features of the client device to the scheduler 870.

The virtual machine pool 880 may be configured to store one or more virtual machines. The virtual machine pool 880 may include software and/or a storage medium capable of storing software. In one example, the virtual machine pool 880 stores a single virtual machine that can be configured by the scheduler 870 to mimic the performance of any client device 830 on the communication network 820. The virtual machine pool 880 may store any number of distinct virtual machines that can be configured to simulate the performance of a wide variety of client devices 830.

The analysis engine 882 simulates the receipt and/or display of the network content from the server device 810 after the network content is received by the client device 110 to analyze the effects of the network content upon the client device 830. The analysis engine 882 may identify the effects of malware or malicious network content by analyzing the simulation of the effects of the network content upon the client device 830 that is carried out on the virtual machine. There may be multiple analysis engines 882 to simulate multiple streams of network content. The analysis engine 882 may be configured to monitor the virtual machine for indications that the suspicious network content is in fact malicious network content. Such indications may include unusual network transmissions, unusual changes in performance, and the like. This detection process is referred to as a dynamic malicious content detection.

The analysis engine 882 may flag the suspicious network content as malicious network content according to the observed behavior of the virtual machine. The reporting module 884 may issue alerts indicating the presence of malware, and using pointers and other reference information, identify the packets of the network content containing the malware. Additionally, the server device 810 may be added to a list of malicious network content providers, and future network transmissions originating from the server device 810 may be blocked from reaching their intended destinations, e.g., by firewall 825.

The computer network system 800 may also include a further communication network 890, which couples the malicious content detection system (MCDS) 850 with one or more other MCDS, of which MCDS 892 and MCDS 894 are shown, and a management system 896, which may be implemented as a Web server having a Web interface. The communication network 890 may, in some embodiments, be coupled for communication with or part of network 820. The management system 896 is responsible for managing the MCDS 850, 892, 894 and providing updates to their operation systems and software programs. Also, the management system 896 may cause malware signatures generated by any of the MCDS 850, 892, 894 to be shared with one or more of the other MCDS 850, 892, 894, for example, on a subscription basis. Moreover, the malicious content detection system as described in the foregoing embodiments may be incorporated into one or more of the MCDS 850, 892, 894, or into all of them, depending on the deployment. Also, the management system 896 itself or another dedicated computer station may incorporate the malicious content detection system in deployments where such detection is to be conducted at a centralized resource.

Further information regarding an embodiment of a malicious content detection system can be had with reference to U.S. Pat. No. 8,171,553, the disclosure of which being incorporated herein by reference in its entirety.

As described above, the detection or analysis performed by the heuristic module 860 may be referred to as static detection or static analysis, which may generate a first score (e.g., a static detection score) according to a first scoring scheme or algorithm. The detection or analysis performed by the analysis engine 882 is referred to as dynamic detection or dynamic analysis, which may generate a second score (e.g., a dynamic detection score) according to a second scoring scheme or algorithm. The first and second scores may be combined, according to a predetermined algorithm, to derive a final score indicating the probability that a malicious content suspect is indeed malicious.

Furthermore, detection systems 850 and 892-894 may deployed in a variety of distribution ways. For example, detection system 850 may be deployed as a detection appliance at a client site to detect any suspicious content, for example, at a local area network (LAN) of the client. In addition, any of MCDS 892 and MCDS 894 may also be deployed as dedicated data analysis systems. Systems 850 and 892-894 may be configured and managed by a management system 896 over network 890, which may be a LAN, a wide area network (WAN) such as the Internet, or a combination of both. Management system 896 may be implemented as a Web server having a Web interface to allow an administrator of a client (e.g., corporation entity) to log in to manage detection systems 850 and 892-894. For example, an administrator may able to activate or deactivate certain functionalities of malicious content detection systems 850 and 892-894 or alternatively, to distribute software updates such as malicious content definition files (e.g., malicious signatures or patterns) or rules, etc. Furthermore, a user can submit via a Web interface suspicious content to be analyzed, for example, by dedicated data analysis systems 892-894. As described above, malicious content detection includes static detection and dynamic detection. Such static and dynamic detections can be distributed amongst different systems over a network. For example, static detection may be performed by detection system 850 at a client site, while dynamic detection of the same content can be offloaded to the cloud, for example, by any of detection systems 892-894. Other configurations may exist.

Figure 6:
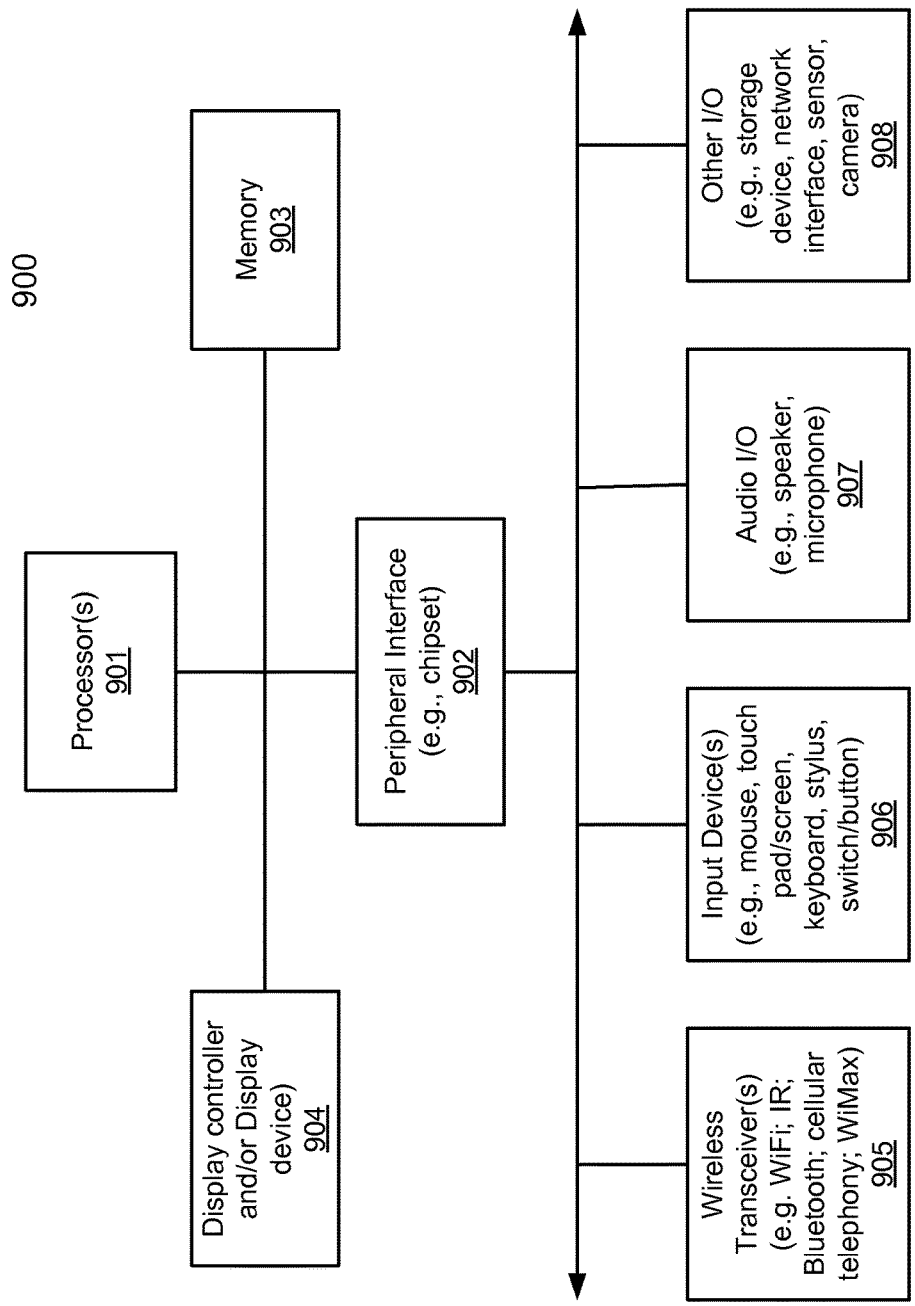
FIG. 6 is a block diagram illustrating an example of a data processing system which may be used with one embodiment of the invention.

FIG. 6 is a block diagram illustrating an example of a data processing system which may be used with one embodiment of the invention. For example, system 900 may represents any of data processing systems described above performing any of the processes or methods described above. System 900 may represent a desktop, a tablet, a server, a mobile phone, a media player, a personal digital assistant (PDA), a personal communicator, a gaming device, a network router or hub, a wireless access point (AP) or repeater, a set-top box, or a combination thereof.

Referring to FIG. 6, in one embodiment, system 900 includes processor 901 and peripheral interface 902, also referred to herein as a chipset, to couple various components to processor 901 including memory 903 and devices 905-908 via a bus or an interconnect. Processor 901 may represent a single processor or multiple processors with a single processor core or multiple processor cores included therein. Processor 901 may represent one or more generalpurpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 901 is configured to execute instructions for performing the operations and steps discussed herein.

Peripheral interface 902 may include memory control hub (MCH) and input output control hub (ICH). Peripheral interface 902 may include a memory controller (not shown) that communicates with a memory 903. Peripheral interface 902 may also include a graphics interface that communicates with graphics subsystem 904, which may include a display controller and/or a display device. Peripheral interface 902 may communicate with graphics device 904 via an accelerated graphics port (AGP), a peripheral component interconnect (PCI) express bus, or other types of interconnects.

An MCH is sometimes referred to as a Northbridge and an ICH is sometimes referred to as a Southbridge. As used herein, the terms MCH, ICH, Northbridge and Southbridge are intended to be interpreted broadly to cover various chips who functions include passing interrupt signals toward a processor. In some embodiments, the MCH may be integrated with processor 901. In such a configuration, peripheral interface 902 operates as an interface chip performing some functions of the MCH and ICH. Furthermore, a graphics accelerator may be integrated within the MCH or processor 901.

Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 902 may provide an interface to 10 devices such as devices 905-908, including wireless transceiver(s) 905, input device(s) 906, audio 10 device(s) 907, and other 10 devices 908. Wireless transceiver 905 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO 907 may include a speaker and/or a microphone to facilitate voice-enabled functions, such as voice recognition, voice replication, digital recording, and/or telephony functions. Other optional devices 908 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 908 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 6 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage medium (e.g., magnetic disks; optical disks; random access memory; read only memory; flash memory devices; phase-change memory) and transitory computer-readable transmission medium (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for detecting phishing activity by determining a password used to decrypt an attachment of a communication message that is intended to be decrypted by a recipient of the communication message, the method comprising:
   in response to a communication message having an encrypted attachment, parsing content of the communication message and predicting a password candidate within a non-encrypted portion of the communication message by identifying a pattern of the content operating as a reference point in predicting the password candidate, wherein the pattern being one or more words and the predicted password candidate being (i) different than and distinct from the pattern and (ii) determined, at least in part, as a portion of the content that is within a predetermined number of words prior to or after the pattern of the content within the non-encrypted portion of the communication message;
   attempting to decrypt the encrypted attachment using the predicted password candidate to generate a decrypted attachment; and
   in response to decrypting the encrypted attachment using the predicted password candidate, performing a malicious content analysis on the decrypted attachment to determine a likelihood of the decrypted attachment containing malicious content, the malicious content analysis includes (i) determining whether data within the decrypted attachment exhibits characteristics associated with malware and (ii) processing the data within one or more virtual machines and observing behaviors occurring within the one or more virtual machines.

2. The method of claim 1, wherein prior to parsing content of the communication message, the method further comprising:
   retrieving a list of one or more default passwords from a local storage; and
   attempting to decrypt the encrypted attachment that is part of a phishing attack using the one or more default passwords.

3. The method of claim 1, wherein the parsing of the content of the communication message and the predicting of the password candidate within a non-encrypted portion of the communication message, comprises:
   recognizing a text string pattern within the content of the non-encrypted portion of the communication message that represents the pattern of the content; and
   extracting one or more characters that are positioned subsequent to the recognized text string pattern as the predicted password candidate.

4. The method of claim 1, wherein
   the predicted password candidate and one or more additional predicted password candidates are determined, at least in part, on the proximity of the content associated with the predicted password candidate and content associated with the one or more additional predicted password candidates to the pattern of the content within the non-encrypted portion of the communication message, and
   in response to the predicted password candidate failing to decrypt the encrypted attachment, attempting to decrypt the encrypted attachment sequentially using the one or more additional predicted password candidates that reside within a predetermined number of words before or after the pattern of content.

5. The method of claim 1, wherein the parsing of the content of the communication message and the predicting of the password candidate within the non-encrypted portion of the communication message, comprises:
   recognizing a text string pattern within the content of the non-encrypted portion of the communication message based on a comparison of the text string pattern with a predetermined template; and
   extracting a string of characters that is within a predetermined amount of text prior to or after the recognized text string pattern as the predicted password candidate.

6. The method of claim 5, wherein the string of characters includes consecutive characters that immediately follow the recognized text string pattern.

7. The method of claim 1, wherein the parsing of the content of the communication message comprises parsing metadata of the communication message to predict the password candidate, the metadata includes content within one or more of the FROM, TO or SUBJECT fields of the communication message.

8. The method of claim 7, wherein the metadata used to predict the password candidate includes metadata identifying at least one of a sender and a recipient of the communication message.

9. The method of claim 7, wherein the metadata used to predict the password candidate includes metadata identifying at least one of an address, a domain name, and a uniform resource locator (URL) associated with the communication message.

10. The method of claim 1 further comprising:
    retrieving a list of one or more default passwords from a local storage; and
    attempting to decrypt the encrypted attachment that is part of a phishing attack using the one or more default passwords,
    wherein one or more of the receiving and the attempting to decrypt the encrypted attachment using the one or more default passwords is conducted in parallel with one or more of the predicting of the password candidate and the attempt to decrypt the encrypted attachment using the predicted password candidate.

11. A non-transitory machine-readable storage medium including instructions stored therein, which when executed by a processor, cause the processor to perform a method of detecting phishing activity by determining a password candidate used to decrypt an attachment of a communication message that is intended to be decrypted by a recipient of the communication message, comprising:

in response to the communication message having an encrypted attachment, parsing content of the communication message to predict the password candidate within a non-encrypted portion of the communication message by identifying a pattern of the content operating as a reference point in predicting the password candidate, wherein the pattern being one or more words and the predicted password candidate being (i) different than and distinct from the pattern and (ii) determined, at least in part, as a portion of the content that is within a predetermined number of words prior to or after the pattern of the content within the non-encrypted portion of the communication message;

attempting to decrypt the encrypted attachment using the predicted password candidate to generate a decrypted attachment; and in response to decrypting the encrypted attachment using the predicted password candidate, performing a malicious content analysis on the decrypted attachment to determine whether the decrypted attachment likely contains malicious content, the malicious content analysis includes (i) determining whether data within the decrypted attachment exhibits characteristics associated with malware and (ii) processing the data within one or more virtual machines and observing behaviors occurring within the one or more virtual machines.

12. The non-transitory machine-readable storage medium of claim 11, wherein the instructions, when executed by the processor, further cause the processor to perform operations prior to parsing content of the communication message, comprising:

retrieving a list of one or more default passwords from a local storage; and attempting to decrypt the encrypted attachment that is part of a phishing attack using the one or more default passwords.

13. The non-transitory machine-readable storage medium of claim 11, wherein the instructions, when executed by the processor, further cause the processor to perform operations for parsing the content of the communication message to predict the password candidate, comprising:

recognizing a text string pattern within the content of the non-encrypted portion of the communication message that represents the pattern of the content; and extracting a string of characters that is positioned subsequent in an order of the parsing to the recognized text string pattern as the predicted password candidate.

14. The non-transitory machine-readable storage medium of claim 13, wherein the predicted password candidate and one or more additional predicted password candidates are determined, at least in part, on the proximity of the content associated with the predicted password candidate and content associated with the one or more additional predicted password candidates to the pattern of the content within the non-encrypted portion of the communication message; and in response to the predicted password candidate failing to decrypt the encrypted attachment, attempting to decrypt the encrypted attachment sequentially using the one or more additional predicted password candidates that reside within a predetermined number of words before or after the pattern of content.

15. The non-transitory machine-readable storage medium of claim 11, wherein the instructions, when executed by the processor, further cause the processor to perform operations for parsing the content of the communication message to predict the password comprising:

recognizing a text string pattern within the content of the non-encrypted portion of the communication message based on a comparison of the text string pattern with a predetermined template; and extracting a string of characters that is within a predetermined amount of text prior to or after the recognized text string pattern as the predicted password candidate, wherein the string of characters is different from any text of the text string pattern.

16. The non-transitory machine-readable storage medium of claim 11, wherein the instructions, when executed by the processor, further cause the processor to perform operations for parsing of the content of the communication message to predict the password candidate, comprising:

recognizing a text string pattern within the content of the non-encrypted portion of the communication message; and extracting a string of characters that are consecutive characters that immediately follow the recognized text string pattern as the predicted password candidate.

17. The non-transitory machine-readable storage medium of claim 11, wherein the parsing of the content of the communication message comprises parsing metadata of the communication message to predict the password candidate.

18. The non-transitory machine-readable storage medium of claim 17, wherein the metadata used to predict the password candidate includes metadata identifying at least one of a sender and a recipient of the communication message.

19. The non-transitory machine-readable storage medium of claim 17, wherein the metadata used to predict the password candidate includes metadata identifying at least one of an address, a domain name, and a uniform resource locator (URL) associated with the communication message.

20. The non-transitory machine-readable storage medium of claim 11, wherein the instructions, when executed by the processor, further cause the processor to perform operations in parallel to parsing content of the communication message to predict the password candidate, comprising:

retrieving a list of one or more default passwords from a local storage; and attempting to decrypt the encrypted attachment that is part of a phishing attack using the one or more default passwords.

21. A data processing system for detecting phishing activity, comprising:

a password predictor, in response to a communication message having an encrypted attachment, to parse content of the communication message to predict a password candidate within a non-encrypted portion of the communication message by identifying a pattern within the content that operates as a reference point in predicting the password candidate, wherein the pattern being one or more words and the predicted password candidate being (i) different than and distinct from the pattern and (ii) determined, at least in part, as a portion of the content that is within a predetermined number of words prior to or after the pattern of the content within the non-encrypted portion of the communication message;

an attachment processing module to attempt to decrypt the encrypted attachment using the predicted password candidate to generate a decrypted attachment; and a content analysis module, in response to decrypting the encrypted attachment using the predicted password candidate, to perform a malicious content analysis on the decrypted attachment to determine whether the decrypted attachment likely contains malicious content, the malicious content analysis includes (i) determining whether data within the decrypted attachment exhibits characteristics associated with malware and (ii) processing the data within one or more virtual machines and observing behaviors occurring within the one or more virtual machines.

22. The system of claim 21, wherein the attachment processing module is to retrieve a list of one or more default passwords from a local storage and to decrypt the encrypted attachment using the one or more default passwords in attempt to generate the decrypted attachment.

23. The system of claim 22, wherein the parsing of the content of the communication message to predict the password candidate within the non-encrypted portion of the communication message comprises:
   recognizing a text string pattern within the content of the non-encrypted portion of the communication message that represents the pattern of the content; and
   extracting one or more characters that are positioned a prescribed amount of text prior to or after the recognized text string pattern as the predicted password candidate.

24. The system of claim 21, wherein the predicted password candidate and one or more additional predicted password candidates are determined, at least in part, on the proximity of the content associated with the predicted password candidate and content associated with the one or more additional predicted password candidates to the pattern of the content within the non-encrypted portion of the communication message.

25. The system of claim 21, wherein the parsing of the content of the communication message to predict the password candidate comprises:
   recognizing a text string pattern within the content of the non-encrypted portion of the communication message; and
   extracting a string of characters that is within a predetermined proximity of the recognized text string pattern as the predicted password candidate and the string of characters being different characters than the text string pattern.

26. The system of claim 25, wherein the string of characters are consecutive characters that immediately follow the recognized text string pattern.

27. The system of claim 21, wherein the password predictor is further configured to parse metadata of the communication message to predict the password candidate.

28. The system of claim 27, wherein the metadata used to predict the password candidate includes metadata identifying at least one of a sender and a recipient of the communication message.

29. The system of claim 27, wherein the metadata used to predict the password candidate includes metadata identifying at least one of an address, a domain name, and a uniform resource locator (URL) associated with the communication message.

30. The system of claim 21, wherein the attachment processing module is to retrieve a list of one or more default passwords from a local storage and to decrypt the encrypted attachment using the one or more default passwords in attempt to generate the decrypted attachment, the attachment processing module operating in parallel with the password predictor.

31. A server comprising:
   a processor; and
   a memory coupled to the processor, the memory includes a plurality of modules that are executed by the processor, the plurality of modules comprise;
   a password predictor configured to detect phishing activity for a communication message having an encrypted attachment upon predicting a password candidate from information within a non-encrypted portion of the communication message, wherein the predicting of the password candidate comprising (i) recognizing a text string pattern within content of the non-encrypted portion of the communication message and (ii) responsive to recognizing the text string pattern, extracting a string of characters that are consecutive characters at least a predetermined number of words or characters prior to or after the recognized text string pattern and distinct from the recognized text string pattern and part of the information within a non-encrypted portion of the communication message as the predicted password candidate;
   an attachment processing module to attempt to decrypt the encrypted attachment using the predicted password candidate to generate a decrypted attachment; and
   a content analysis module, in response to decrypting the encrypted attachment using the predicted password candidate, to perform a malicious content analysis on the decrypted attachment to determine a likelihood of whether the decrypted attachment is associated with phishing activity by including malicious content, the malicious content analysis includes (i) determining whether data within the decrypted attachment exhibits characteristics associated with malware and (ii) processing the data within one or more virtual machines and observing behaviors occurring within the one or more virtual machines,
   wherein the password predictor and the attachment processing module to extract a second string of characters at most a predetermined distance in characters prior to or after the recognized text string pattern for use as a second predicted password candidate if the attachment processing module is unable to decrypt the encrypted attachment using the predicted password candidate.

* * * * *